(12) United States Patent
Wolff et al.

(10) Patent No.: US 9,926,833 B2
(45) Date of Patent: Mar. 27, 2018

(54) SYSTEM AND METHOD FOR CONTROLLING A VEHICLE

(71) Applicant: GENERAL ELECTRIC COMPANY, Schenectady, NY (US)

(72) Inventors: Jeffrey John Wolff, Erie, PA (US); Edward Thomas Petrak, Lawrence Park, PA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 20 days.

(21) Appl. No.: 15/147,977

(22) Filed: May 6, 2016

(65) Prior Publication Data

US 2017/0321593 A1 Nov. 9, 2017

(51) Int. Cl.
| *F01P 7/00* | (2006.01) |
| *F01P 1/00* | (2006.01) |
| *B60K 11/00* | (2006.01) |
| *F01P 7/12* | (2006.01) |
| *F01P 5/06* | (2006.01) |
| *F01P 3/20* | (2006.01) |
| *F01P 1/06* | (2006.01) |
| *B60K 11/02* | (2006.01) |
| *B60K 11/08* | (2006.01) |

(52) U.S. Cl.
CPC ............... *F01P 7/12* (2013.01); *B60K 11/02* (2013.01); *B60K 11/085* (2013.01); *F01P 1/06* (2013.01); *F01P 3/20* (2013.01); *F01P 5/06* (2013.01)

(58) Field of Classification Search
CPC ........ F01P 7/00; F01P 7/12; F01P 1/00; F01P 1/06; F01P 3/00; F01P 3/20; B60K 11/00
See application file for complete search history.

(56) References Cited

U.S. PATENT DOCUMENTS

| 5,566,745 A | 10/1996 | Hill et al. |
| 5,669,311 A | 9/1997 | Hill et al. |
| 6,374,780 B1 * | 4/2002 | Rutyna ................... F01P 7/048 123/41.12 |
| 6,394,044 B1 | 5/2002 | Bedapudi et al. |
| 6,668,764 B1 * | 12/2003 | Henderson .............. F01P 7/167 123/41.1 |
| 7,984,684 B2 * | 7/2011 | Hinderks .................. B63B 1/28 114/274 |
| 8,655,545 B2 * | 2/2014 | Yu ........................ B60K 11/085 701/29.1 |
| 8,826,893 B2 * | 9/2014 | Marsh ....................... F01P 3/20 123/41.29 |
| 8,922,033 B2 | 12/2014 | Vallinayagam et al. |
| 9,168,828 B2 * | 10/2015 | Bourqui .................. F16H 19/08 |
| 9,250,020 B2 * | 2/2016 | Vikstrom ................ F28F 27/02 |

(Continued)

*Primary Examiner* — Yonel Beaulieu
(74) *Attorney, Agent, or Firm* — GE Global Patent Operation; John A. Kramer

(57) ABSTRACT

A thermal management system for an engine includes a radiator in fluid communication with the engine, a fan operable to provide air flow through the radiator, and a shutter assembly positioned on an opposite side of the radiator from the fan and being adjustable to control the air flow through the radiator. The radiator includes a first radiator section and a second radiator section, the first and second radiator sections each having a fore end and an aft end, respectively, wherein the first radiator section and the second radiator section converge at the respective fore ends and define an angle therebetween.

20 Claims, 3 Drawing Sheets

(56) References Cited

U.S. PATENT DOCUMENTS

| | | | |
|---|---|---|---|
| 2003/0101947 A1* | 6/2003 | Ries-Mueller | F01P 7/12 123/41.05 |
| 2008/0141921 A1* | 6/2008 | Hinderks | B63B 1/28 114/274 |
| 2009/0267540 A1* | 10/2009 | Chemel | F21S 9/043 315/297 |
| 2010/0025006 A1* | 2/2010 | Zhou | B60H 1/00278 165/41 |
| 2011/0296855 A1* | 12/2011 | Johnston | B60L 3/0046 62/79 |
| 2012/0168125 A1* | 7/2012 | Johnston | F28F 27/02 165/96 |
| 2012/0270490 A1 | 10/2012 | Turner et al. | |
| 2014/0110488 A1 | 4/2014 | Surnilla et al. | |
| 2014/0123917 A1* | 5/2014 | Chellan | F01P 7/10 123/41.04 |
| 2014/0345400 A1* | 11/2014 | Bourqui | F16H 19/08 74/89.16 |
| 2015/0260095 A1* | 9/2015 | Hinderks | B63B 1/28 123/568.11 |

\* cited by examiner

SYSTEM AND METHOD FOR CONTROLLING A VEHICLE

TECHNICAL FIELD

Embodiments of the invention relate generally to vehicles. Certain embodiments relate to systems and methods for controlling a vehicle, for reducing fuel consumption in a vehicle.

BACKGROUND

In some vehicles, electrically motorized wheels propel or retard the vehicle. In particular a large horsepower diesel engine may be used with an alternator, a traction inverter, and wheel drive assemblies housed within the rear tires of the vehicle. In operation, a diesel engine drives an alternator, which powers the traction inverter. The traction inverter includes semiconductor power switches that commutate the alternator output current to provide electrical power to electric drive motors, e.g., AC traction motors, of the wheel drive assemblies, which transform the electrical power back into mechanical power to drive the wheels and propel the vehicle.

Many such vehicles also require cooling systems for the engine and other components in order to maintain temperatures below maximum operating thresholds of such components. For example, a radiator and fan may be utilized to cool the engine. The radiator is typically situated behind a grille, which permits air to flow therethrough and to the radiator. The air contacts and cools the radiator fins, which in turn cool the circulating radiator fluid that cools the engine. Additional fans and air inlets (with or without a radiator) may be utilized to provide cooling for other components of the vehicle.

The configuration and operation of existing systems, however, may adversely affect fuel economy of the vehicle, particularly in cold weather or at higher vehicle speeds. In particular, existing systems typically do not allow for airflow horsepower to be reduced in operating modes that require reduced or no cooling due to direct coupling of the fan to the alternator and engine. In particular, operation of the fan in such modes requires the continuing consumption of fuel, even though no cooling may be needed. Moreover, as the velocity of a vehicle increases, the amount of airflow through the grill and into the engine compartment increases, which slows the vehicle and makes the engine work harder. The additional airflow through the grille at higher vehicle speeds can therefore detrimental to fuel economy. In particular, as vehicle velocity increases, the amount of aerodynamic drag increases as a result of the increased airflow into the engine compartment. As aerodynamic drag increases, more energy is required to move the vehicle.

In view of the above, there may be a need for a system and method which differ from those that are currently available.

BRIEF DESCRIPTION

In an embodiment, a thermal management system for an engine includes a radiator in fluid communication with the engine, a fan operable to provide air flow through the radiator, and a shutter assembly positioned on an opposite side of the radiator from the fan and being adjustable to control the air flow through the radiator. The radiator includes a first radiator section and a second radiator section. The first and second radiator sections each have a fore end and an aft end, respectively. The first radiator section and the second radiator section converge at the respective fore ends and define an angle therebetween, In another embodiment, a vehicle includes an engine, a radiator in fluid communication with the engine, a grille opening, and a fan operable to draw a flow of air through the grill opening and through the radiator. The radiator includes a first radiator section and a second radiator section, the first and second radiator sections each having a front end and a rear end, respectively. The first and second radiator sections converge at their respective front ends and define an angle therebetween. The respective front ends of the radiator sections are positioned adjacent to the grille opening and the respective rear ends being positioned distal from the grille opening.

In another embodiment, a method (e.g., of engine operation and/or control) includes the steps of drawing a flow of air through a radiator to provide cooling for an engine, the radiator being in fluid communication with the engine, monitoring one or more operating parameters to determine a level of cooling required for the engine, and controlling a flow of the air through an inlet and the radiator in dependence upon the one or more monitored operating parameters.

DRAWINGS

The present invention will be better understood from reading the following description of non-limiting embodiments, with reference to the attached drawings, wherein below:

DETAILED DESCRIPTION

Figure 1:
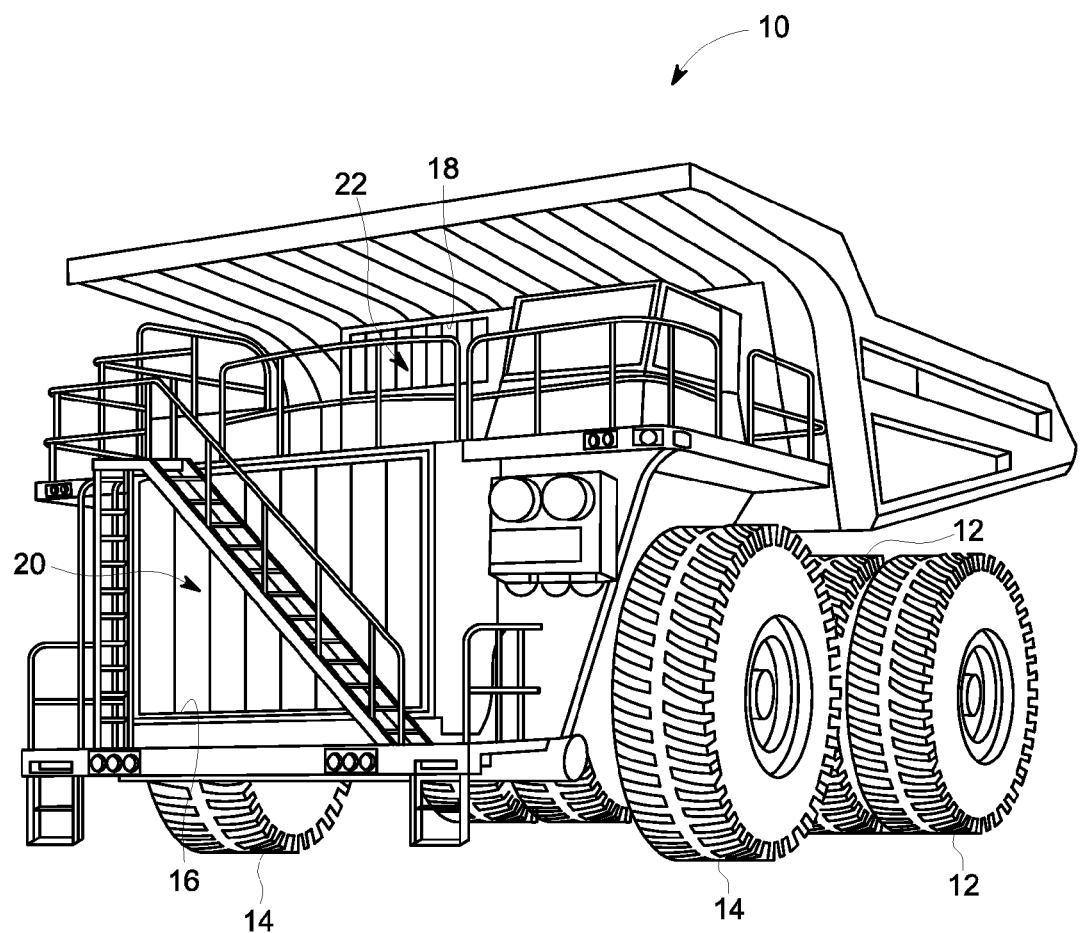
FIG. 1 is a perspective view of an off-highway vehicle, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use vehicles, generally, an OHV has been selected for clarity of illustration for the disclosure of mobile embodiments. Other suitable vehicles include, for example, on-road vehicles, locomotives, construction equipment, industrial equipment, and marine vessels. As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

Embodiments of the invention relate generally to vehicle control. Certain embodiments relate to systems and methods for reducing fuel consumption in a vehicle in cold weather and at higher vehicle speeds. In one embodiment, a thermal management system for an engine includes a radiator in fluid communication with the engine, a fan operable to provide air flow through the radiator, and a shutter assembly positioned on an opposite side of the radiator from the fan and being adjustable to control the air flow through the radiator. The radiator includes a first radiator section and a second radiator section, the first and second radiator sections each having a fore end and an aft end, respectively, wherein the first radiator section and the second radiator section converge at the respective fore ends and define an angle therebetween, The angled radiator reduces wind drag at higher vehicle speeds, thereby reducing engine load. And, an engine operating under a reduced load may consume less fuel than it might otherwise use. In a particular embodiment, first and second radiator sections may be a single, integrated component.

An embodiment of the inventive system for reducing fuel consumption is configured for use with a vehicle, such as an off-highway vehicle ("OHV") 10 as depicted in FIG. 1. As shown, the OHV 10 is supported on paired dual rear drive tire assemblies 12 and on single front steering tire assemblies 14. The rear drive tire assemblies 12 are driven by a drive system described below in connection with FIG. 2. As illustrated in FIG. 1, the vehicle 10 includes a forward-facing opening or grille 16 and inlet duct opening 18 that facilitate the ingress of air for cooling one or components of the vehicle 10 such as, for example, components of the drive system of the vehicle. The opening 16 is in fluid communication with an engine compartment of the vehicle 10, while opening 18 may be in fluid communication with other components of the drive system of the vehicle. Each opening 16, 18 may be configured with a respective shutter assembly 20, 22 that is controllable to selectively vary the amount of air that is permitted to enter the vehicle 10 through the openings 16, 18, as discussed hereinafter.

The shutter assemblies 20, 22 each include a plurality of louvers or louver elements that are each configured to rotate about a respective pivot axis, effectively controlling the size of the openings 16, 18 and the amount of ambient air flowing into the vehicle 10 through the openings 16, 18. The shutter assemblies 20, 22 are each configured to operate between a fully closed position or state and a fully open position or state.

Figure 2:
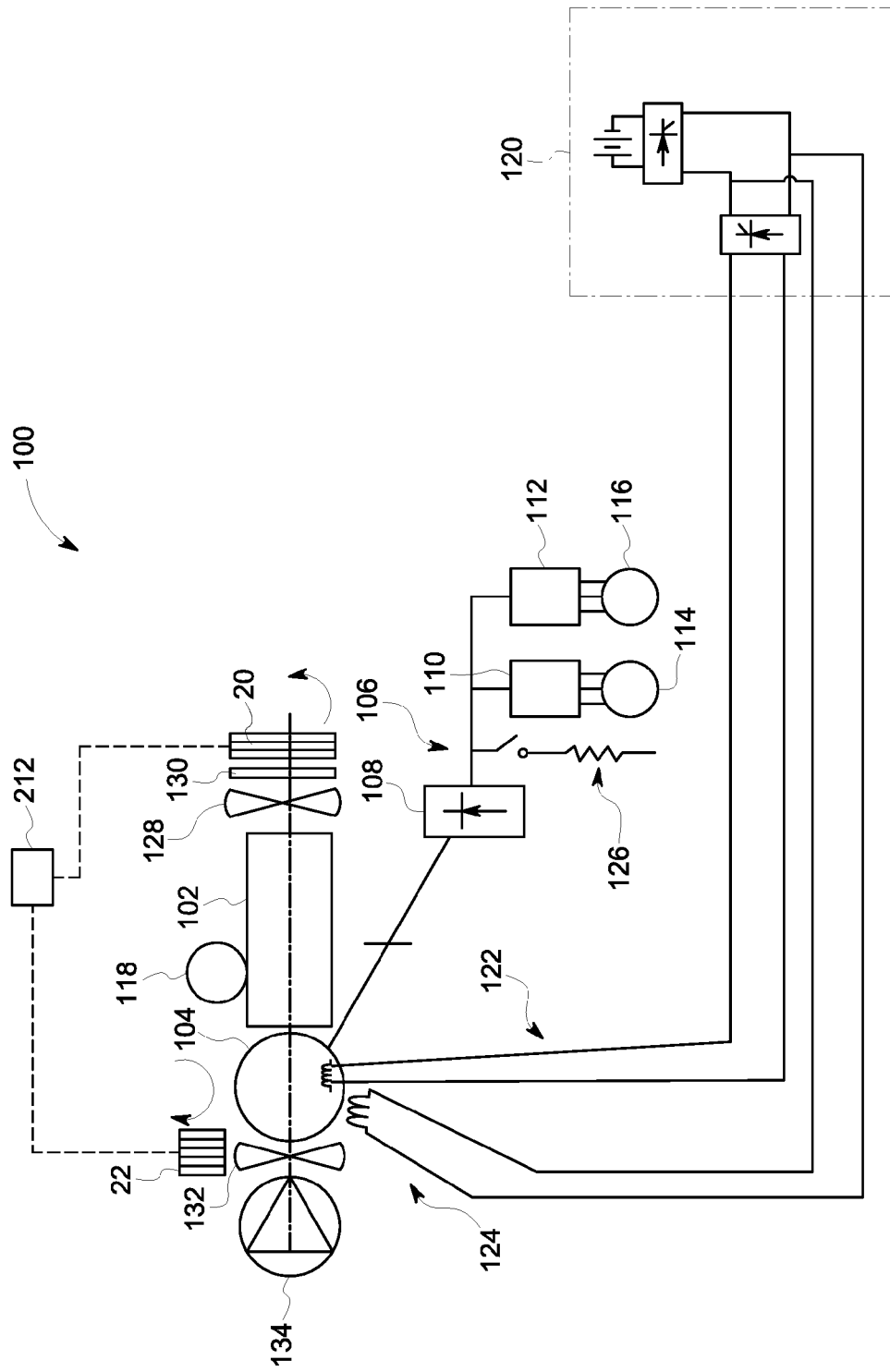
FIG. 2 is a schematic diagram of a system for reducing fuel consumption in a vehicle, according to another embodiment of the invention.

Turning now to FIG. 2, a schematic illustration of an exemplary drive system 100 for an electric drive machine such as OHV 10 or other vehicle is shown. The drive system 100 includes a primary power source such as an engine 102 (e.g., a diesel engine, a gasoline engine, a multi-fuel engine, etc.) and a traction alternator/generator 104 mechanically coupled to and driven by the engine 102. As illustrated in FIG. 2, the traction alternator 104 is electrically coupled to a traction bus 106. The alternator 104 is configured to provide AC electric power to one or more rectifiers 108, which are electrically connected to one or more power converters, e.g., first and second inverters 110, 112, via the traction bus 106. The inverters 110, 112 are connected to first and second traction motors 114, 116 associated with first and second wheels of the vehicle (e.g., wheels 12), respectively. As is known in the art, the rectifier 108 is configured to convert the AC power received from the alternator 104 into a DC output which is then fed to the inverters 110, 112 through the traction bus 106. The inverters 110, 112 are configured to supply three-phase, variable frequency AC power to the first and second traction motors 114, 116 associated with the first and second wheels of the vehicle (typically the rear wheels of the vehicle). While the rectifier 108 is illustrated as being separate from the traction alternator 104, in certain embodiments, the rectifier may form a part of the alternator, as is known in the art. In an embodiment, the traction bus 106 is 1000-1500 VDC bus.

As also shown in FIG. 1, in an embodiment, a starter motor 118 may be associated with the engine 102 for rotating the engine 102 so as to initiate operation, as is known in the art. In addition, the vehicle may include a battery 120, e.g. a 24V battery, electrically coupled to the alternator 104 through a tertiary winding 122 and a field winding 124. The battery 120 is configured to function as an alternator field static excitor to initiate operation of the electric drive system of the vehicle.

The traction motors 114, 116 provide the tractive power to move the vehicle, and may be AC or DC electric motors. When using DC traction motors, the output of the alternator is typically rectified to provide appropriate DC power. When using AC traction motors, the alternator output is typically rectified to DC and thereafter inverted to three-phase AC before being supplied to the traction motors 114, 116. During a propel mode of operation, power may be transferred from the engine 102 to the traction motors 114, 116, and thus to the wheels of the vehicle to effect movement.

In addition to providing motive power, the traction motors 114, 116 also provide a braking force for controlling the speed of the vehicle on which the drive system 100 is deployed. This is commonly referred to as dynamic braking. During a dynamic braking mode of operation, such as when motion of the vehicle is to be retarded, power may be generated by the mechanical rotation of the drive wheels and directed toward a retarding grid 126. In particular, the kinetic energy of the vehicle may be converted into rotational power at the drive wheels. Rotation of the drive wheels may further rotate the motors 114, 116 so as to generate electrical power, for example, in the form of AC power. The inverters 110, 112 may serve as a bridge to convert the power supplied by the motors 114, 116 into DC power. Dissipation of the DC power generated by the motors 114, 116 may produce a counter-rotational torque at the drive wheels to decelerate the vehicle. Such dissipation may be accomplished by passing the generated current provided by the inverters 110, 112 through a resistance, such as the dynamic braking grid 126, or retarding grid, as shown.

As further illustrated in FIG. 2, the drive system 100 also includes an engine radiator fan 128 driven by the engine 12 that is configured to draw air through the opening 16 of the vehicle 10, and through an air-to-fluid heat exchanger such as a radiator 130, to provide cooling for the engine 102. In an embodiment, the fan 128 is an axial fan, although other types of fans may also be utilized without departing from the broader aspects of the invention.

The system 100 may also include one or more auxiliary cooling fans 132 mechanically coupled to the alternator 104 and associated with the opening 18. The auxiliary cooling fan(s) 132 is configured to draw air through the opening 18 of the vehicle 10 to provide cooling for other components of the traction drive system, such as the inverters 110, 112, traction motors 114, 116 and the like. In an embodiment, the cooling fans 132 may be backward curved centrifugal fans, although other types of cooling fans known in the art may also be utilized. The traction alternator 104 may also be coupled to a hydraulic pump 134 which provides hydraulic pressure for use by accessories or other components of the vehicle. That is, in addition to providing electrical power to the traction bus 106 to enable operation of the traction motors 114, 116 to propel the vehicle, the alternator 104, via power from the engine 102, provides electrical power to other components such as hydraulic pumps and cooling fans.

Figure 3:
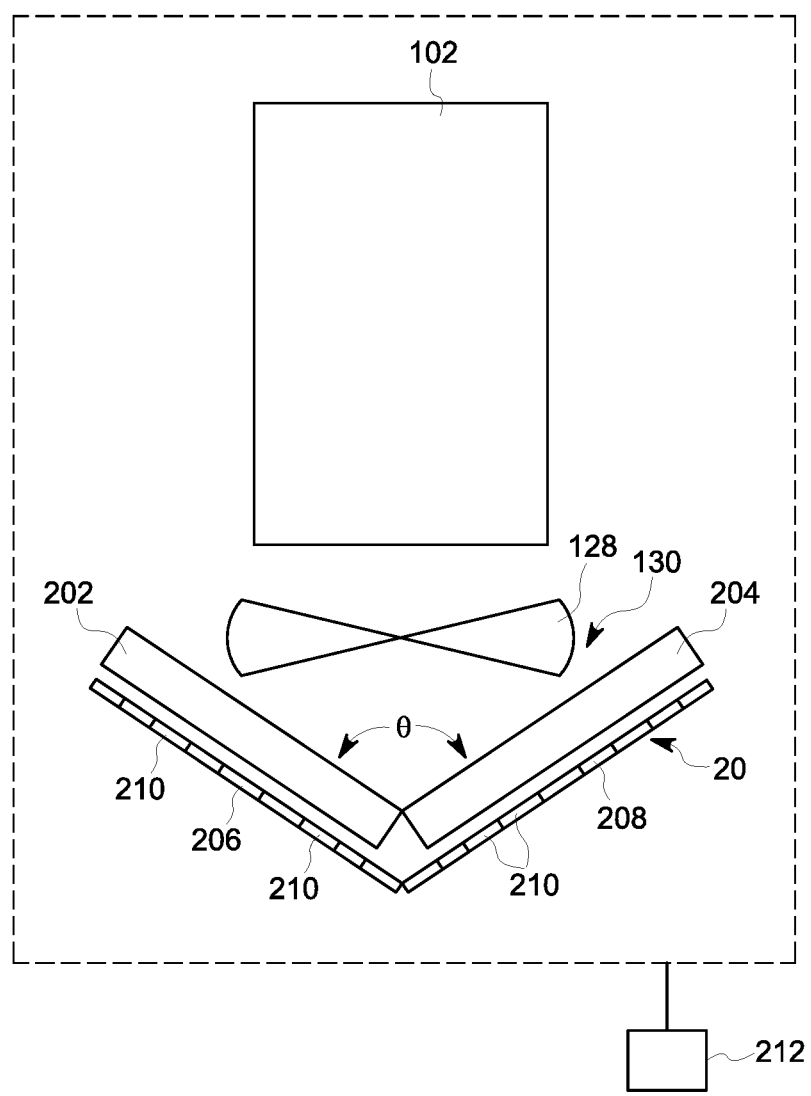
FIG. 3 is a simplified schematic diagram of a portion of the system of FIG. 2, showing a thermal management system for an engine.

Referring now to FIG. 3, a schematic illustration of a thermal management system 200 of the vehicle 10, for reducing fuel consumption of the vehicle 10, is illustrated. As shown therein, the system 200 includes the engine 102, the radiator 130 in fluid communication with the engine 102, the fan 128 and the shutter assembly 20 positioned within the forward-facing opening 16 of the vehicle 10. As indicated above, the fan 128 is operable to draw air into the engine compartment through the opening 16, through shutter assembly 20 and ultimately through the radiator 130. As the air passes through the radiator 130, it contacts and cools the fins of the radiator 130, which in turn cool the circulating radiator fluid or coolant that cools the engine 102.

As illustrated in FIG. 3, the radiator 130 includes a first radiator section 202 and a second radiator section 204, each having a fore end and an aft end, respectively. As used here, "fore" and "aft" are used in reference to the primary direction of travel of the vehicle 10, where wheels 14 are positioned at the fore end of the vehicle and the wheels 12 are positioned at the aft end of the vehicle. As shown, the first and second radiator sections 202, 204 converge at their respective fore ends and define an angle, θ, therebetween. In an embodiment, the angle, θ, may be less than 180 degrees, or in a range of from about 150 degrees to about 180 degrees, or from about 130 degrees to about 150 degrees, or from about 120 degrees to about 150 degrees, or from about 90 degrees to about 120 degrees, or from about 60 degrees to about 90 degrees, or from about 30 degrees to about 60 degrees. In embodiments, the angle, θ, may be less than about 90 degrees and greater than about 0 degrees, or may be less than about 180 degrees and greater than about 90 degrees (i.e., the sections are not co-planar and are not perpendicular to one another). In certain embodiments, the angle, θ, may be approximately 60 degrees. In an embodiment, the angle may be selected in dependence upon an anticipated operating speed of the vehicle, or average speed, and the amount of drag that results from a selected angle at such operating speeds, as well as cooling requirements for the vehicle under various ambient conditions.

This split radiator design, having two opposing sections that converge and form an apex at the front of the vehicle 10, improves the aerodynamic characteristics of the vehicle as a whole, particularly when compared to traditional flat, forward facing radiators, while still providing for required vehicle cooling. Indeed, traditional forward facing radiators with a flat front have a large surface area that contributes to a substantial wind drag, especially at higher vehicle speeds, which is detrimental to fuel efficiency. Utilizing a cone- or wedge-shaped radiator decreases wind drag, particularly at higher vehicle speeds, which can achieve a reduction in fuel consumption as compared to existing vehicles. This translates to reduced operating costs, particularly over long in-service or use periods. As used herein, "higher vehicle speeds" means vehicle speeds in excess of approximately 20 miles per hour.

With further reference to FIG. 3, in an embodiment, the shutter assembly 20 is positioned within opening 16 in the front end of the vehicle 10 forward of the radiator 130. In other embodiments, the shutter assembly may be integrated with the radiator 130 rather than the opening 16. As shown therein, the shutter assembly 20 includes a first shutter section 206 associated with the first radiator section 202 and a second shutter section 208 associated with the second radiator section 204. In an embodiment, the first and second shutter sections 206, 208 are arranged substantially parallel to the first and second radiator sections 202, 204, respectively. As alluded to above, the first and second radiator sections 206, 208 each include a plurality of louvers or louver elements 210 that are configured to rotate about a respective pivot axis, effectively controlling the amount of ambient air flowing into the vehicle 10 through the openings 16. The first and second shutter sections 206, 208 are each configured to operate between a fully closed position or state and a fully open position or state.

In connection with the above, each shutter section 206, 208 includes an actuator mechanism that is operable by a controller 212 to selectively vary the position of the louver elements 210 in order to regulate the amount of air permitted to pass through each section and into each radiator section. The mechanism may include a plurality of mechanical linkages and rods driven by a motor controlled by the controller 212, although other mechanisms for controlling the position of the louver elements such as hydraulic actuators may be utilized without departing from the broader aspects of the invention. In an embodiment, the shutter sections 206, 208 may each be controlled individually by the controller 212 such that one shutter section, e.g., shutter section 206, may be open while shutter section 208 may be closed. In certain embodiments, the shutter sections 206, 208 may each include another actuator (not shown) that is operable by the controller 212 to adjust the angle of the shutter sections 206, 208.

In an embodiment, the controller 212 may be a master controller that is configured to control overall operation of the vehicle and drive system components, including to control the traction motors of the drive system and the various components thereof, and the electricity supplied to and from the traction motor system, as is known in the art.

In embodiments, the controller 212 is configured to regulate the flow of air into the vehicle by controlling the position of the louver elements 210 of one or both of the shutter sections 206, 208 in dependence upon one or more operating parameters of the vehicle 10 and/or ambient conditions. These parameters may includes fan clutch position, fan speed, engine speed, ambient air temperature, barometric pressure, engine water temperature, coolant temperature and vehicle speed, as well as other parameters that may influence the level of cooling needed for the engine 102 or other vehicle components. In connection with the above, the controller 212 is configured to receive signals from various sensors and vehicle components indicating the various operating parameters and ambient conditions. The controller 212 is operable to process this information utilizing an algorithm stored in memory and/or according to stored parameter thresholds to determine the optimal shutter positions for each shutter section 206, 208 to meet engine cooling requirements while minimizing fuel consumption.

For example, the controller 212 may be configured to close each shutter section 206, 208 when it is determined that cooling is not need, such as in cold weather, to prevent air from entering the engine compartment. Likewise, the controller 212 may close the shutter sections 206, 208 if the ambient temperature and/or engine temperature are below preset temperature thresholds and the vehicle is moving at a speed above a threshold speed. As indicated above, the controller 212 may control the shutter position in dependence upon a single parameter, or a combination of such parameters.

In some embodiments, airflow into the vehicle may additionally be controlled by the speed of the fan 128 (which may be controllable by controller 212). In some embodiments, the fan speed and shutter sections 206, 208 may be collaboratively controllable by the controller 212. For example, the controller 212 may be configured to decrease the speed of the fan 128 when the shutters are at their fully opened positions and/or increase the fan speed as the shutters are partially closed.

Certain vehicles, such as OHVs, traditionally utilize a cooling fan that is directly coupled to the alternator and engine. This direct coupling does not allow for airflow horsepower (i.e., the fan load) to be reduced in operating modes where cooling is not required or where reduced cooling is sufficient. The system 200 of the invention, however, can be utilized to restrict the airflow into the vehicle through the use of shutters in such operating modes. For example, in an embodiment, the airflow into the vehicle for cooling the engine may be reduce by varying the position of the shutter sections 206, 208 to obtain a target optimal operating temperature of the engine. In another embodiment, if the engine and cooling system temperature is below a preset threshold, the controller 212 may be configured to close the shutters at low or no load conditions, such as when the vehicle is idling or parked. In other embodiments, the controller 212 may be configured to restrict the airflow into the vehicle by closing the shutters (or partially closing the shutters) in situations where the airflow through the radiator 130 exceeds the required flow to meet cooling requirements such as when vehicle speed increases. In each of these situations, fuel consumption may be decreased by restricting the amount of airflow into the vehicle by closing the shutters. Moreover, certain vehicles (including different types of vehicles) may have different configurations and have different needs, so some embodiments described herein may work better in some applications rather than in others.

Moreover, as with the split, angled radiator 130, the angled shutter sections 206, 208 improve the aerodynamic characteristics of the vehicle 10, particularly when the shutters are closed, and particularly at higher vehicle speeds. In particular, the angled shutter sections 206, 208, when closed, form a wedge that functions to divert air around the vehicle and reduce wing drag. As discussed above, reducing drag allows for more efficient vehicle operation by reducing the amount of fuel burn necessary to maintain a desired vehicle speed.

Referring back to FIG. 2, the same concepts may be applied to control airflow through opening 18 by controlling the position of the shutter assembly 22. In particular, the control unit 212 may be configured to adjust the position of the shutter assembly 22 in order to regulate the amount of airflow into the vehicle through the opening 18 in dependence upon one or more ambient conditions and/or one or more vehicle operating parameters. In addition to the parameters listed above, these parameters may include the temperature of various other drive system components such as, for example, the traction motors 114, 116, inverters 110, 112, rectifier 108, etc.

In an embodiment, a thermal management system for an engine is provided. The system includes a radiator in fluid communication with the engine, the radiator including a first radiator section and a second radiator section, the first and second radiator sections each having a fore end and an aft end, respectively, wherein the first radiator section and the second radiator section converge at the respective fore ends and define an angle therebetween, a fan operable to provide air flow through the radiator, and a shutter assembly positioned on an opposite side of the radiator from the fan and being adjustable to control the air flow through the radiator. In an embodiment, the angle is approximately 60 degrees. In an embodiment, the shutter assembly includes a first shutter section associated with the first radiator section and a second shutter assembly associated with the second radiator section, wherein the first shutter section and the section shutter are arranged generally parallel to the first and second radiator sections, respectively. In an embodiment, the system may also include a controller configured to control the shutter assembly in dependence upon one or more parameters including fan clutch position, fan speed, engine speed, ambient air temperature, barometric pressure, engine water temperature, coolant temperature and vehicle speed. In an embodiment, the first shutter section and the second shutter section are individually controllable. In an embodiment, the thermal management system is on-board an off-highway vehicle. In an embodiment, the fan is an axial fan.

In another embodiment, a vehicle is provided. The vehicle includes an engine, a radiator in fluid communication with the engine, the radiator including a first radiator section and a second radiator section, the first and second radiator sections each having a front end and a rear end, respectively, a grille opening, and a fan operable to draw a flow of air through the grill opening and through the radiator. The first and second radiator sections converge at their respective front ends and define an angle therebetween, the respective front ends of the radiator sections being positioned adjacent to the grille opening and the respective rear ends being positioned distal from the grille opening. In an embodiment, the vehicle may also include a mechanism configured to selectively restrict and unrestrict the grill opening for regulating an amount of air flowing into the vehicle. In an embodiment, the mechanism includes a shutter assembly arranged relative to the grill opening, the shutter assembly being adjustable to regulate an amount of the air flowing into the vehicle through the grill opening. The shutter assembly may include a first shutter section associated with the first radiator section and a second shutter section associated with the second radiator section, wherein the first shutter section and the second shutter section are arranged generally parallel to the first and second radiator sections, respectively. In an embodiment, the vehicle may also includes a controller configured to control the shutter assembly in dependence upon one or more parameters including fan clutch position, fan speed, engine speed, ambient air temperature, barometric pressure, engine water temperature, coolant temperature and vehicle speed. In an embodiment, the first shutter section and the second shutter section are individually controllable. In an embodiment, the vehicle is one of an off-highway vehicle and a locomotive. In an embodiment, the fan is an axial fan. In an embodiment, the vehicle may further include an inlet, an auxiliary fan configured to draw air through the inlet to provide cooling for a vehicle component, and a second shutter assembly associated with the inlet, the second shutter assembly being adjustable to regulate an amount of air flowing into the vehicle through the inlet in dependence upon the one or more parameters.

In yet another embodiment, a method is provided. The method includes the steps of drawing a flow of air through a radiator to provide cooling for an engine, the radiator being in fluid communication with the engine, monitoring one or more operating parameters to determine a level of cooling required for the engine, and controlling a flow of the air through an inlet and the radiator in dependence upon the one or more monitored operating parameters. In an embodiment, the method may include the step of providing the radiator with a first radiator section and a second radiator section, the first and second radiator sections each having a fore end and an aft end, respectively, wherein the first radiator section and the second radiator section converge at the respective fore ends and define an angle therebetween. In an embodiment, the step of controlling the flow of air through the inlet includes controlling a position of a shutter assembly arranged in the inlet. In an embodiment, the step of controlling the flow of air includes controlling the flow of air in dependence upon at least one of fan clutch position, fan speed, engine speed, ambient air temperature, barometric pressure, engine water temperature, coolant temperature and vehicle speed. In an embodiment, the method may also include the step of restricting a flow of air through a second inlet associated with an auxiliary cooling fan in dependence upon the one or more operating parameters, wherein the step of restricting the flow of air through the second inlet includes controlling a position of a second shutter assembly arranged in the second inlet.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal management system for an engine, comprising:
   a radiator in fluid communication with the engine, the radiator including a first radiator section and a second radiator section, the first and second radiator sections each having a fore end and an aft end, respectively, wherein the first radiator section and the second radiator section converge at the respective fore ends and define an angle therebetween;
   a fan operable to provide air flow through the radiator; and
   a shutter assembly positioned on an opposite side of the radiator from the fan and being adjustable to control the air flow through the radiator.

2. The thermal management system of claim 1, wherein: the angle is approximately 60 degrees.

3. The thermal management system of claim 1, wherein: the shutter assembly includes a first shutter section associated with the first radiator section and a second shutter section associated with the second radiator section;
   wherein the first shutter section and the second shutter section are arranged generally parallel to the first and second radiator sections, respectively.

4. The thermal management system of claim 3, further comprising:
   a controller configured to control the shutter assembly in dependence upon one or more parameters including fan clutch position, fan speed, engine speed, ambient air temperature, barometric pressure, engine water temperature, coolant temperature and vehicle speed.

5. The thermal management system of claim 4, wherein: the first shutter section and the second shutter section are individually controllable.

6. The thermal management system of claim 1, wherein: the thermal management system is on-board an off-highway vehicle.

7. The thermal management system of claim 1, wherein: the fan is an axial fan.

8. A vehicle, comprising:
   an engine;
   a radiator in fluid communication with the engine, the radiator including a first radiator section and a second radiator section, the first and second radiator sections each having a front end and a rear end, respectively;
   a grille opening; and
   a fan operable to draw a flow of air through the grille opening and through the radiator,
   wherein the first and second radiator sections converge at their respective front ends and define an angle therebetween, the respective front ends of the radiator sections being positioned adjacent to the grille opening and the respective rear ends being positioned distal from the grille opening.

9. The vehicle of claim 8, further comprising:
   a shutter assembly configured to selectively restrict and unrestrict the grille opening for regulating an amount of air flowing into the vehicle.

10. The vehicle of claim 9, wherein: the shutter assembly is arranged relative to the grille opening and is adjustable to regulate the amount of the air flowing into the vehicle through the grille opening.

11. The vehicle of claim 10, wherein: the shutter assembly includes a first shutter section associated with the first radiator section and a second shutter section associated with the second radiator section;
    wherein the first shutter section and the second shutter section are arranged generally parallel to the first and second radiator sections, respectively.

12. The vehicle of claim 10, further comprising:
    a controller configured to control the shutter assembly in dependence upon one or more parameters including fan clutch position, fan speed, engine speed, ambient air temperature, barometric pressure, engine water temperature, coolant temperature and vehicle speed.

13. The vehicle of claim 12, wherein: the first shutter section and the second shutter section are individually controllable.

14. The vehicle of claim 8, wherein: the vehicle is one of an off-highway vehicle and a locomotive.

15. The vehicle of claim 8, wherein: the fan is an axial fan.

16. The vehicle of claim 12, further comprising:
    an inlet;
    an auxiliary fan configured to draw air through the inlet to provide cooling for a vehicle component; and
    a second shutter assembly associated with the inlet, the second shutter assembly being adjustable to regulate an amount of air flowing into the vehicle through the inlet in dependence upon the one or more parameters.

17. A method, comprising the steps of:
    drawing a flow of air through a radiator to provide cooling for an engine, the radiator being in fluid communication with the engine, the radiator including a first radiator section and a second radiator section, the first and second radiator sections each having a fore end and an aft end, respectively, wherein the first radiator section and the second radiator section converge at the respective fore ends and define an angle therebetween;

monitoring one or more operating parameters to determine a level of cooling required for the engine; and controlling a flow of the air through an inlet and the radiator in dependence upon the one or more monitored operating parameters.

18. The method according to claim 17, wherein:
the step of controlling the flow of air through the inlet includes controlling a position of a shutter assembly arranged in the inlet.

19. The method according to claim 17, wherein:
the step of controlling the flow of air includes controlling the flow of air in dependence upon at least one of fan clutch position, fan speed, engine speed, ambient air temperature, barometric pressure, engine water temperature, coolant temperature and vehicle speed.

20. The method according to claim 17, further comprising the step of:
restricting a flow of air through a second inlet associated with an auxiliary cooling fan in dependence upon the one or more operating parameters;
wherein the step of restricting the flow of air through the second inlet includes controlling a position of a second shutter assembly arranged in the second inlet.

* * * * *